United States Patent
Petcavich et al.

(10) Patent No.: US 9,075,179 B2
(45) Date of Patent: Jul. 7, 2015

(54) LIGHT-EXTRACTION GRAPHICS FILM

(75) Inventors: Robert J. Petcavich, The Woodlands, TX (US); Daniel K. Van Ostrand, The Woodlands, TX (US); Martin A. Kykta, The Woodlands, TX (US); Ying Zhou, The Woodlands, TX (US); Christopher B. Derichs, The Woodlands, TX (US)

(73) Assignee: UNIPIXEL DISPLAYS, INC., The Woodlands, TX (US)

( * ) Notice: Subject to any disclaimer, the term of this patent is extended or adjusted under 35 U.S.C. 154(b) by 601 days.

(21) Appl. No.: 13/393,083

(22) PCT Filed: Sep. 14, 2010

(86) PCT No.: PCT/US2010/048736
§ 371 (c)(1),
(2), (4) Date: Apr. 2, 2012

(87) PCT Pub. No.: WO2011/032135
PCT Pub. Date: Mar. 17, 2011

(65) Prior Publication Data
US 2012/0182767 A1    Jul. 19, 2012

Related U.S. Application Data

(60) Provisional application No. 61/241,960, filed on Sep. 14, 2009.

(51) Int. Cl.
*F21V 8/00* (2006.01)
*G02B 5/02* (2006.01)
*G09F 13/18* (2006.01)

(52) U.S. Cl.
CPC ........... *G02B 6/0061* (2013.01); *G02B 5/0221* (2013.01); *G02B 5/0231* (2013.01); *G02B 5/0263* (2013.01); *G02B 6/0053* (2013.01); *G09F 13/18* (2013.01)

(58) Field of Classification Search
CPC ...... G09F 13/18; G02B 6/0061; G02B 5/0021
USPC ............... 362/97.1–97.4, 606, 627, 622
See application file for complete search history.

(56) References Cited

U.S. PATENT DOCUMENTS

| | | | |
|---|---|---|---|
| 7,740,387 B2 * | 6/2010 | Schultz et al. | 362/606 |
| 7,780,329 B2 * | 8/2010 | McCollum et al. | 362/606 |
| 7,991,257 B1 * | 8/2011 | Coleman | 385/129 |
| 8,322,874 B2 * | 12/2012 | Ender | 362/97.1 |
| 2006/0132453 A1 * | 6/2006 | Boyd et al. | 345/173 |
| 2007/0058391 A1 | 3/2007 | Wilson et al. | |
| 2009/0179870 A1 | 7/2009 | Scholz et al. | |
| 2010/0026703 A1 * | 2/2010 | Parker et al. | 345/589 |

OTHER PUBLICATIONS

International Application No. PCT/US2010/048736, Search Report and Written Opinion dated Apr. 29, 2011, 7 pages.

* cited by examiner

*Primary Examiner* — Anabel Ton
(74) *Attorney, Agent, or Firm* — Conley Rose, P.C.

(57) ABSTRACT

In at least some embodiments, a film for use with an edge-lit backlight includes a substrate. The film also includes a graphics layer and light-extraction features in contact with the substrate. The graphics layer and the light-extraction features are on opposite surfaces of the substrate.

29 Claims, 6 Drawing Sheets

LIGHT-EXTRACTION GRAPHICS FILM

STATEMENT REGARDING FEDERALLY SPONSORED RESEARCH OR DEVELOPMENT

Not applicable.

BACKGROUND

In edge-lit backlighting, light from a light source (e.g., cold cathode fluorescent lamps, LEDs, etc.) is coupled into the wave guide (also called a light guide) and then extracted out of the wave guide through frustrated total internal reflection (FTIR). The light extraction occurs, for example, using micro-optical structures in contact with the wave guide. Efforts to facilitate the combination of micro-optical structures with a wave guide for edge-lit backlighting are continually being developed. One example of an edge-lit backlighting application is static signage (i.e., an illuminated static sign).

SUMMARY

In at least some embodiments, a film for use with a total internal reflection (TIR) wave guide includes a substrate. The film also includes a graphics layer and light-extraction features in contact with the substrate, wherein the graphics layer and the light-extraction features are on opposite sides of the substrate.

In at least some embodiments, a display system includes a light-extraction graphics film having a printed graphics layer and a light-extraction layer. The display system also comprises an edge-lit backlight in contact with the light-extraction graphics film. Light from the edge-lit backlight is extracted by the light-extraction graphics film.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
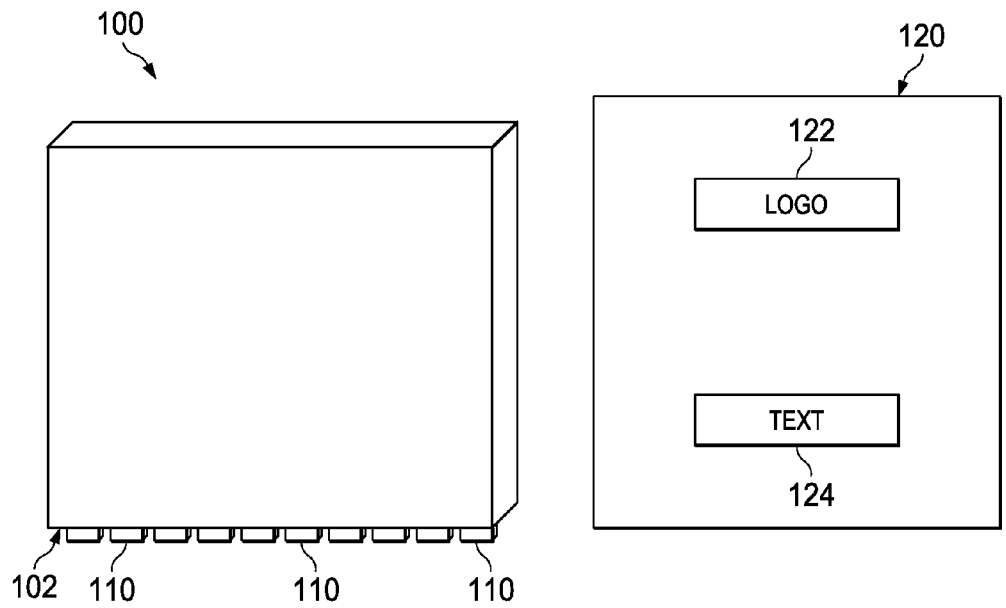
FIG. 1 shows components of a display system in accordance with embodiments of the disclosure.

FIG. 1 shows components of a display system 100 in accordance with embodiments of the disclosure. The display system 100 comprises an edge-light backlight comprising a wave guide (e.g., a thin polycarbonate sheet) 102 and a light source 110 (e.g., one or more light-emitting diodes (LEDs) or cold cathode fluorescent lamps (CCFLs)) positioned along at least one side of the wave guide 102. The wave guide 102 and the light source 110 operate as a thin planar backlight (using total internal reflection (TIR)). In accordance with at least some embodiments, no light-extraction features are included with the wave guide 102. The light source 110 may emit white light, or sequentially emit different colored lights (e.g., red, green, blue), or sequentially emit white light and different colored lights.

The display system 100 further comprises a light-extraction graphics film 120. As shown, the light-extraction graphics film 120 comprises a logo 122, text 124 and/or other graphical representations to promote a company and/or product. In other words, the components of the display system 100 (i.e., the wave guide 102, the light source 110 and the light-extraction graphics film 120) are combinable to produce thin-profile illuminated advertisements for companies and/or products. The light-extraction graphics film 120 may alternatively be decorative in nature. In general, the logo 122, the text 124, or other graphical representations may be customized for any thin-profile illuminated application. Regardless of the application, the graphics logos or text may correspond to printed graphics.

It should be noted that the light-extraction graphics film 120 does not have to be the same size or shape as the wave guide 102. Light will be extracted from the wave guide 102 only in the location where the light-extraction graphics film 120 is mated with the wave guide 102. This allows for great creativity in laying out decorative advertisements. The combination of a transparent wave guide with a customized light-extraction graphics film 120 (the size, the shape, the graphics being customized) allows for great flexibility and creative opportunities for the placement of an illuminated sign. Further, in some embodiments, the light-extraction graphics film 120 may be applied to opposite surfaces of the wave guide 102.

Figure 2A:
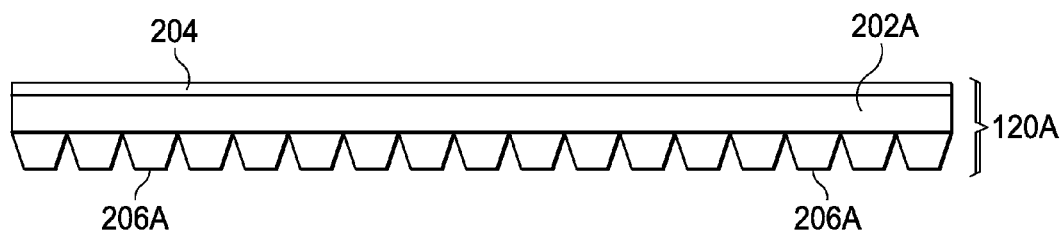
FIGS. 2A-2F show cross-sections of light-extraction graphics film embodiments in accordance with embodiments of the disclosure.
Figure 6:
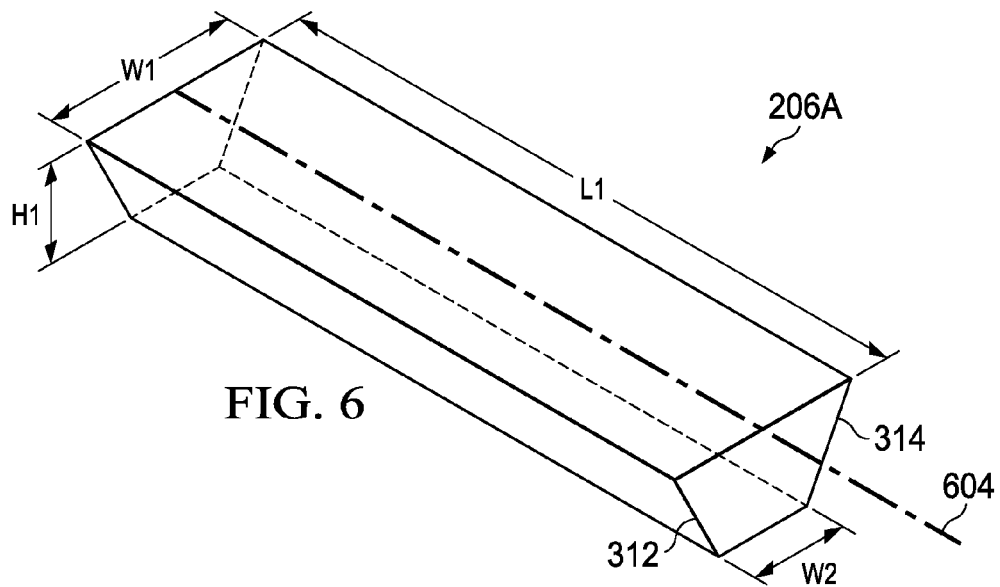
FIG. 6 shows a light-extraction microstructure for use with a light-extraction graphics film in accordance with an embodiment of the disclosure.

FIG. 2A shows a cross-section of a light-extraction graphics film 120A in accordance with an embodiment of the disclosure. In FIG. 2A, the light-extraction graphics film 120A comprises a transparent substrate 202A (e.g., PET film) with a printable graphics layer 204 on one side (the top-side) and light-extraction features 206A on the other side (the bottom-side). The printable graphics layer 204 is attached to the transparent substrate with, for example, an adhesive. As previously discussed for FIG. 1, logos, text, or other graphical representations may be printed on the printable graphics layer 204. The light-extraction features 206A on the bottom-side of the substrate operate to extract light from a total internal reflection (TIR) wave guide (not shown)) and redirect that light through the printable graphics layer 204 towards a viewer. In the cross-section of FIG. 2A, the light-extraction features 206A are trapezoidal in shape. The overall shape for each light-extraction feature 206A is illustrated in FIG. 6. Other light-extraction feature shapes are possible as well.

Figure 2B:
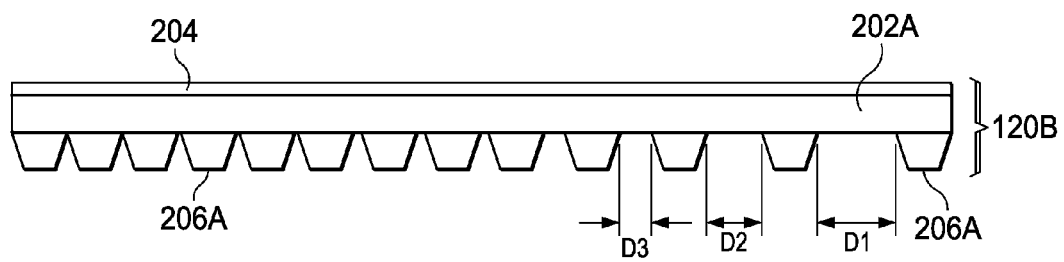

FIG. 2B shows a cross-section of an alternative light-extraction graphics film 120B in accordance with another embodiment of the disclosure. In FIG. 2B, the spacing between different light-extraction features 206A is shown to vary (i.e., each of $d_1$, $d_2$, and $d_3$ corresponds to a different spacing). The number of spacing variations is not limited to any particular number. In general, the spacing (i.e., the pitch between adjacent features) of light-extraction features 206A nearest to the light source 110 (e.g., $d_1$ is nearest in FIG. 2B) is largest with subsequent spacings (e.g., $d_2$ and $d_3$ and so on) being incrementally smaller. In at least some embodiments, the spacing also varies in correlation with the thickness of the wave guide used with the light-extraction graphics film 120B. As wave guide thickness decreases (light bounces off the light extraction surface of the wave guide more frequently), the spacing between light-extraction features 206A should be increased. Further, if there are multiple light-injection edges (one on each side), the spacing of light-extraction features 206A would be smallest near the center of the light-extraction graphics film 120B and largest at the edges.

The spacing technique shown in FIG. 2B enables light-extraction performed by the light-extraction features 206A to appear uniform to a viewer. Alternative techniques to improve uniformity of light-extraction include, but are not limited to: the use of a non-linear distribution of diffuser/scattering properties in at least one contiguous layer of the light-extraction graphics film 120A (described in FIGS. 2C and 2D) such that the density of the scattering particles is greater in the locations of the film that are positioned the greatest distance away from the light injection edge(s), the use of an adhesive layer as the light extraction feature 206B deposited to the light-extraction graphics film 120B in a non-linear distribution of islands (i.e., dots) with the lowest density closest to the light injection edge(s), and/or a non-linear distribution of randomly oriented light-extraction features (described in FIGS. 8 and 9) with the lowest density closest to the light injection edge(s).

In some embodiments, the spacing of the light extraction features 206A does not change with respect to the distance from the light source. In these cases, the spacing is uniform across the entire light-extraction graphics film 120B and directly correlates to the thickness of the wave guide. For example, the light extraction graphics film 120A (shown with uniformly spaced light-extraction features 206A) is more effective when used with a wave guide of a thickness that corresponds to the spacing between the light extraction features 206A. Further, in at least some embodiments, the angular output of the light-extraction features 206A may be designed for optimal appearance when viewed from a predetermined angle (i.e., light-extraction is approximately perpendicular to the wave guide or is at another predetermined angle determined by the angular output of light-extraction features 206A).

Figure 2C:
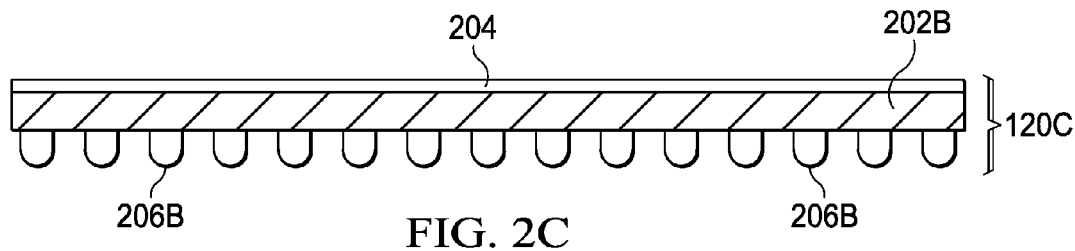

FIG. 2C shows a cross-section of an alternative light-extraction graphics film 120C in accordance with another embodiment of the disclosure. In FIG. 2C, the substrate 202B includes diffuser properties. The diffuser properties in substrate 202B diffuse the angular output of the light extracted by light-extraction features 206B, which may correspond to islands (or dots) of adhesive, in order to generate a wider viewing angle and create a more uniform distribution of light across all output angles. In different embodiments, light-extraction features may include straight-line reflective surfaces (e.g., light-extraction features 206A), curved-line reflective surfaces (e.g., light-extraction features 206B), or both. Usable shapes for light-extraction features include, but are not limited to, v-grooves, curved discs, and ridges.

Figure 2D:
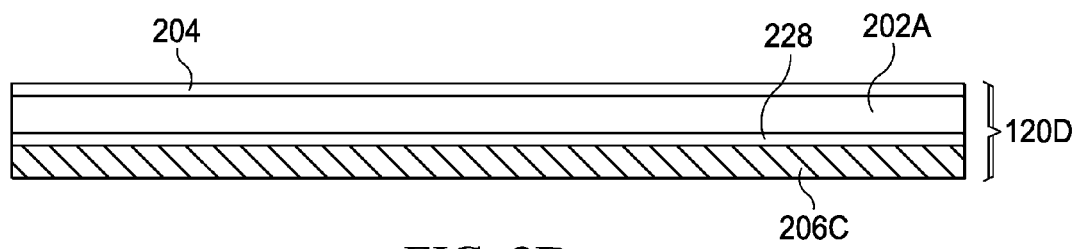

FIG. 2D shows a cross-section of an alternative light-extraction graphics film 120D in accordance with another embodiment of the disclosure. In FIG. 2D, the printable graphics layer 204 is shown on the top-side of the substrate 202A. On the bottom-side of the substrate 202A a transparent cladding layer 228 and an adhesive layer 206C (operating as a light-extraction feature) is used. In at least some embodiments, the transparent cladding layer 228 has a low refractive index (between 1.03 and 1.45). The purpose of the transparent cladding layer 228 is to reflect a portion of the light that has been extracted by the light extraction features back into the waveguide in order to achieve a greater uniformity of light extraction. The adhesive 206C is comprised of a transparent adhesive with embedded scattering particles, which is used to extract light when in contact with a TIR wave guide (not shown). The scattering particles used with adhesive 206C may vary with respect to density, refractive index, size (e.g., from 5 nm to 500 µm) and/or shape to achieve uniform light-extraction.

Figure 2E:
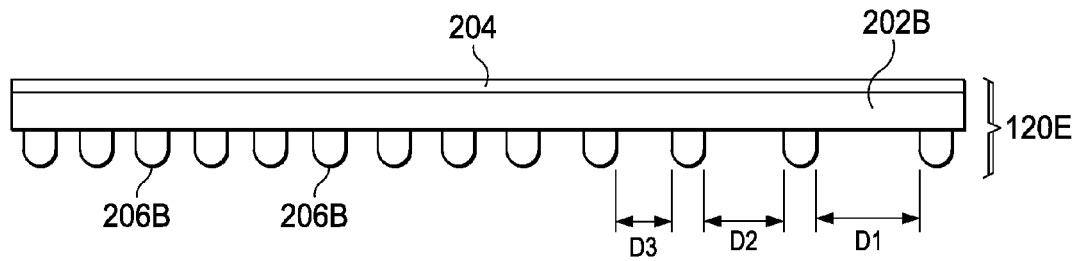

FIG. 2E shows a cross-section of an alternative light-extraction graphics film 120E in accordance with another embodiment of the disclosure. In FIG. 2E, the spacing between different light-extraction features 206B is shown to vary (i.e., each of $d_1$, $d_2$, and $d_3$ corresponds to a different spacing) in a manner similar to the light-extraction features 206A of FIG. 2B. The spacing technique shown in FIG. 2E enables light-extraction performed by the light-extraction features 206B to appear uniform to a viewer. Alternative techniques to improve uniformity of light-extraction include, but are not limited to: the use of a non-linear distribution of diffuser/scattering properties in at least one contiguous layer of the light-extraction graphics film 120E such that the density of the scattering particles is greater in the locations of the film that are positioned the greatest distance away from the light injection edge(s), the use of an adhesive layer as the light-extraction feature deposited to the light-extraction graphics film 120E in a non-linear distribution of islands (i.e., dots) with the lowest density closest to the light injection edge(s), and/or a non-linear distribution of randomly oriented light-extraction features (described in FIGS. 8 and 9) with the lowest density closest to the light-injection edge(s).

In some embodiments, the spacing of the light extraction features 206B does not change with respect to the distance from the light source. In these cases, the spacing is uniform across the entire light-extraction graphics film 120E and the spacing required to achieve uniform light output directly correlates to the thickness of the wave guide. For example, the light extraction graphics film 120C (shown with uniformly spaced light-extraction features 206B) is more effective when used with a wave guide of a thickness that corresponds to the spacing between the light extraction features 206B.

Figure 2F:
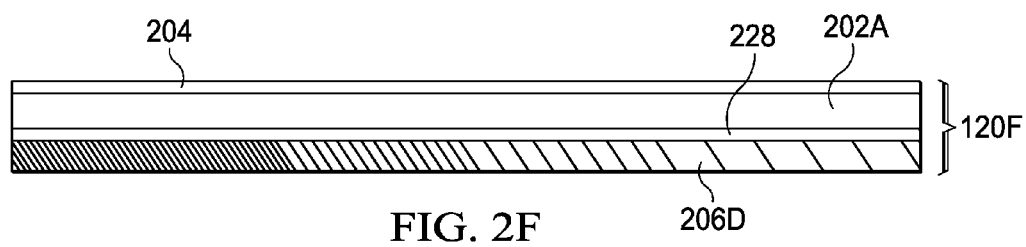

FIG. 2F shows a cross-section of an alternative light-extraction graphics film 120F in accordance with another embodiment of the disclosure. In FIG. 2E, the density of light-scattering particles in light-extraction feature 206D is shown to increase from right to light (assuming a light-injection edge to the right light-extraction graphics film 120F). If there are multiple light-injection edges (one on each side), the density of light-scattering particles in light-extraction feature 206D would be highest near the center of the light-extraction graphics film 120F and lowest at the edges.

Figure 3:
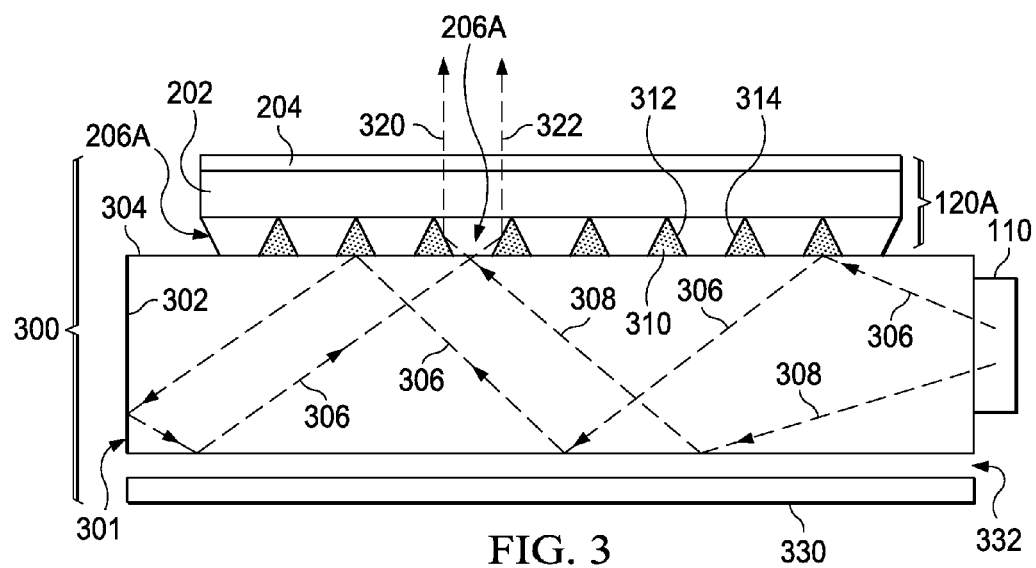
FIG. 3 shows a cross-section of an assembled display system in operation in accordance with an embodiment of the disclosure.

FIG. 3 shows a cross-section of an assembled display system 300 in operation in accordance with an embodiment of the disclosure. The assembled display system 300 comprises the light-extraction graphics film 120A of FIG. 2A. Alternatively, the light-extraction graphics film embodiments of FIGS. 2B-2D could be used. The assembled display system 300 also comprises a transparent wave guide 301 in contact with the light-extraction graphics film 120A. The transparent wave guide 301 may correspond, for example, to glass, plastic, or other suitable material (e.g., the thin polycarbonate sheet 102 of FIG. 1). As shown in FIG. 3, a light source 110 (e.g., LEDs or CCFLs) is positioned on at least one side of the transparent wave guide 301. Positioning the light source 110 to the side of the transparent wave guide 301 rather than below the transparent wave guide 301 enables thin-profile backlighting. The assembled display system 300 may also comprise a mirror 330 (on the bottom-side of the transparent wave guide 301) separated from the transparent wave guide 301 by an air gap 332. The mirror 330 will reflect any light that is not captured by TIR in the waveguide 301 toward the graphics film 120A. The air gap 332 increases the efficiency of the wave guide 301 since it assures an efficient TIR reflection interaction (approaching 100% efficiency); whereas light reflected by the mirror 330 has an absorption component. The use of both the air gap 332 and the mirror 330 is even more efficient than an air gap only, but is not necessarily required.

In operation, light from the light source 110 is injected into the waveguide 301. The wave guide 301 generally causes a total internal reflection (TIR) phenomenon in which the light rays reflect off the internal surfaces of the wave guide 301. Light-extraction features 206A are recessed into or extend outward from the bottom surface of the light-extraction graphics film 120A. Each microstructure 206A that is in contact with the light extraction surface 304 causes light from within the wave guide 301, and originating from the light source 110, to reflect in a direction nearly normal (perpendicular) to the plane of the wave guide's largest surface. As such, each microstructure 206A extracts light from the wave guide 301. The extracted light can then be used to illuminate a printed graphics layer 204.

In at least some embodiments, the microstructures 206A are provided as part of a light-extraction graphics film 120A which is adhered to the top surface 304 of the waveguide 301. The shaded triangular regions between microstructures 206A comprise air. As previously discussed, the film 120A comprises a substrate 204 to which the light-extraction features 206A are mated or in which such features are formed. The light-extraction graphics film 120A could have light-extraction features that are raised from or recessed into the film. Further, the light-extraction graphics film 120A could be applied to the top, bottom or both sides of the waveguide.

In FIG. 3, a single light source 110 is shown to the right and injects light into the waveguide. The direction of travel of two light waves is shown with reference numerals 300 and 308. Light wave 308 reflects off the bottom surface of the waveguide and then proceeds to contact one of the microstructures 206A which causes the light to be extracted from the waveguide 301. Each microstructure 206A comprises two angled side surfaces 312 and 314 as shown. Light wave 306 contacts the distal side surface 312 (distal with respect to the light source 110). The angle of the side surface 312 is set so that the light 320 that reflects off that surface exits the light-extraction graphics film 120A in a direction that is generally perpendicular to the plane of the waveguide 301.

Light wave 306 also reflects off of the bottom surface of the waveguide 301 and then contacts the top surface but not at a location occupied by a microstructure 206A. The TIR nature of the waveguide 301 causes the light to reflect off the bottom and top surfaces until it contacts the rear surface 302 which is a mirrored surface thereby again causing the light to reflect off the rear surface 302. The rear surface can also be made to have a small air gap between the wave guide 301 and a rear surface mirror. The light 306 then begins traversing back through the waveguide 301 until it contacts a microstructure 206A as shown. The extracted light contacts proximal side surface 314 which reflects the light (light 322) at a direction generally perpendicular to the plane of the waveguide 301. In this way, the microstructures 206A cause the light to be extracted from the waveguide 301.

The net affect of numerous closely spaced microstructures 206A is that light entering the waveguide 301 from the side is caused to emanate out of the waveguide 301 in a range of angles (including, for example, 90 degrees) centered at normal direction to waveguide surface. Such light can be used to illuminate a printed graphics layer 204 of the light-extraction graphics film 120A. As previously mentioned, the light-extraction graphics layer embodiments of FIGS. 2B-2D could alternatively be used instead of light-extraction graphics layer 120A with similar results.

Figure 4:
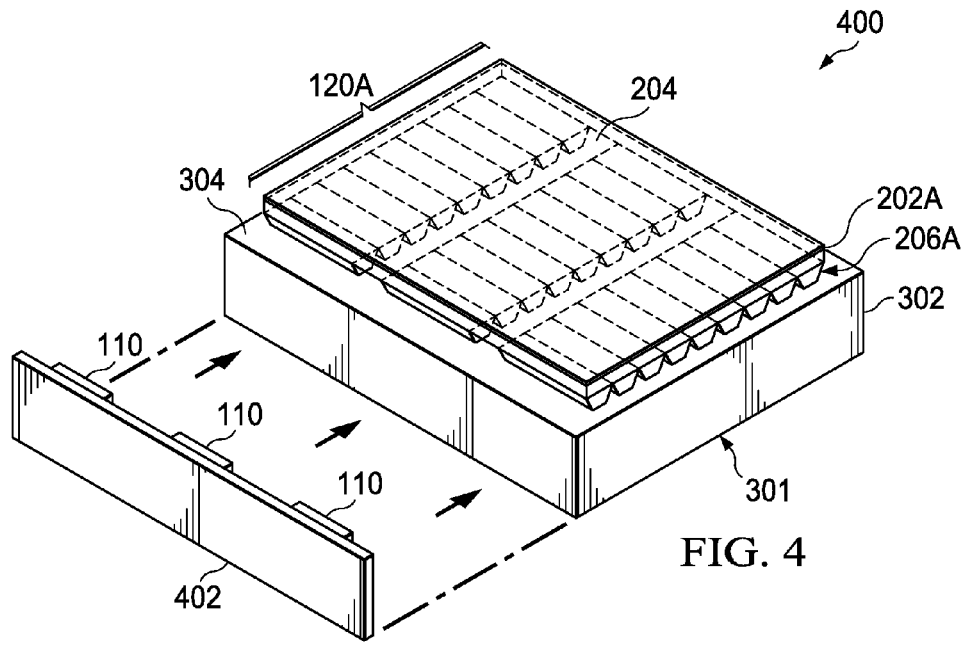
FIG. 4 shows a perspective view of an assembled display system in accordance with an embodiment of the disclosure.

FIG. 4 shows a perspective view of an assembled display system 400 in accordance with an embodiment of the disclosure. The assembled display system 400 comprises the wave guide 301 in contact with the light-extraction graphics film 120A as in FIG. 3. As shown in FIG. 4, light-extraction features 206A substantially cover the top-surface 304 of the waveguide 301. Further, the light sources 110 are mounted to a panel 402 to facilitate positioning the light sources 110 along side the wave guide 301. Light extracted by the light-extraction features 206A is used to illuminate a printed graphics layer 204 of the light-extraction graphics film 120A.

Figure 5:
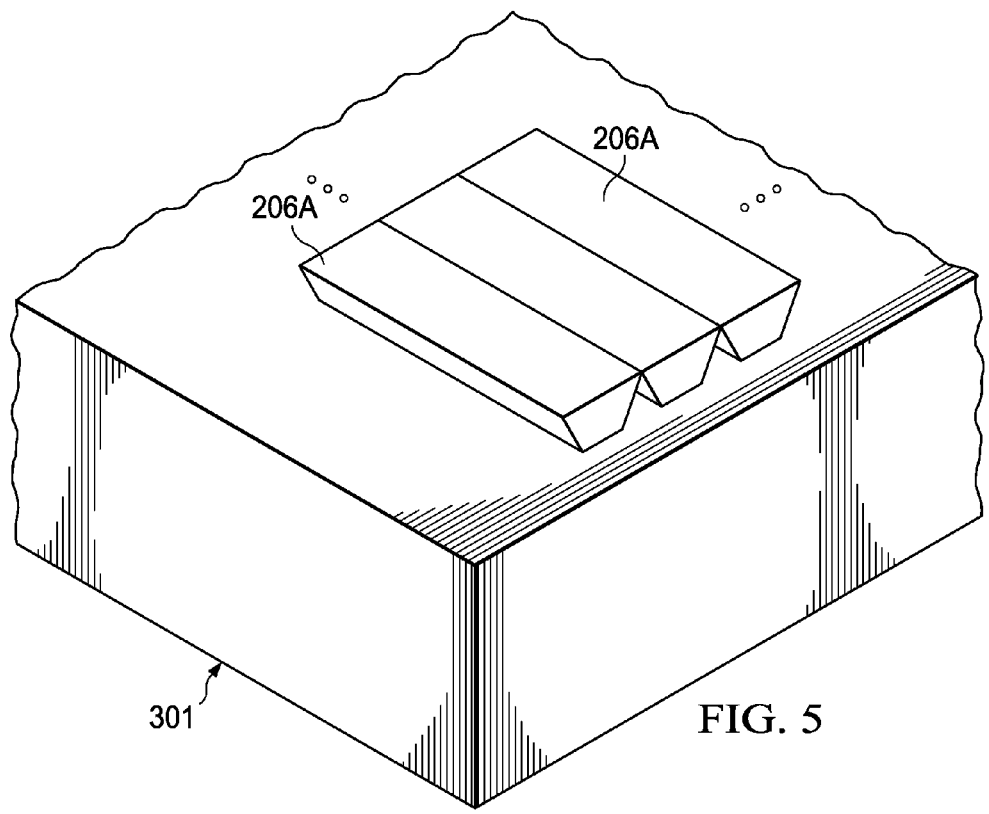
FIG. 5 shows a perspective view of light-extraction features in contact with a surface of the wave guide of FIG. 4.

FIG. 5 shows close-up detail of several of light-extraction features 206A. In the embodiment of FIG. 5, each light-extraction feature 206A comprises a trapezoidal frustum (or truncated prism) and thus the cross-sectional shape is a trapezoid. In the embodiment of FIGS. 4 and 4, the light-extraction features 206A are generally arranged in a uniformly oriented fashion.

Figure 7:
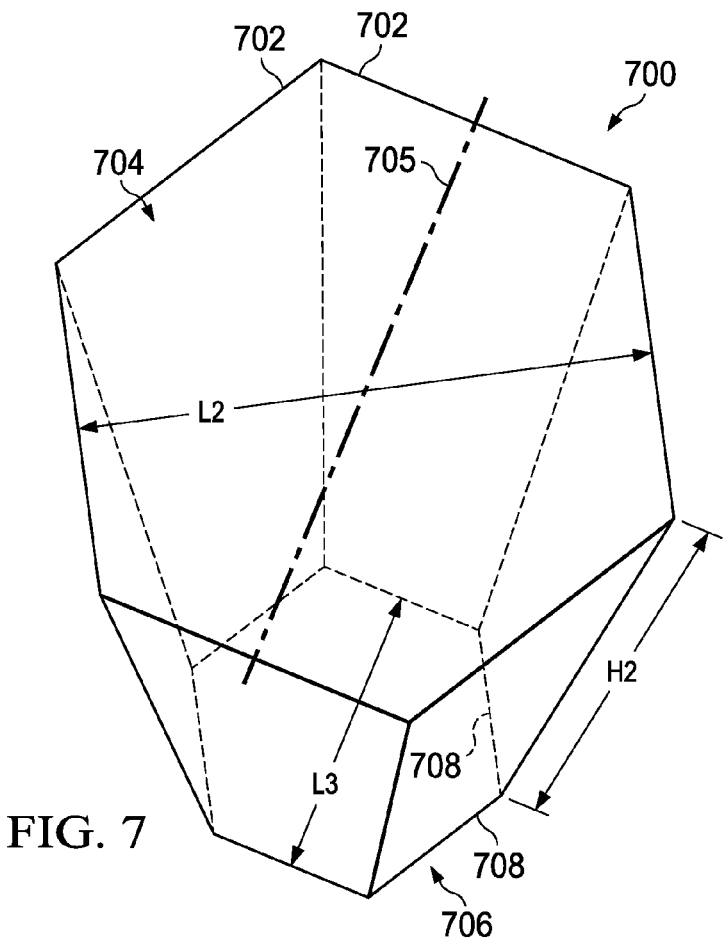
FIG. 7 shows another light-extraction microstructure for use with a light-extraction graphics film in accordance with an embodiment of the disclosure.

FIGS. 6 and 7 illustrate two examples of light-extraction features (microstructures) usable in accordance with disclosed embodiments. In FIG. 6, the light-extraction feature 206A is as described previously—a trapezoidal frustum. The length is represented by L1 and the height by H1. The width of the long side of trapezoidal cross-section is represented as W1 and the width of the trapezoid's short side is W2. The dimensions of L1, H1, W1, and W2 can be customized to suit varying desires and applications. In some embodiments, however, L1 is in the range of 4 to 1000 microns, H1 is in the range of 1.5 to 105 microns, W1 is in the range of 4 to 400 microns, and W2 is in the range of 2 to 150 microns. Axis 604 is also shown extending along the length L1 of the light-extraction feature 206A. The short side (W2) is the side that contacts the waveguide 12.

FIG. 7 illustrates a light-extraction feature 700 in the form of a truncated hexagonal frustum (or truncated hexagonal prism). The top surface 704 and bottom surface 706 of light-extraction feature 700 are hexagonal with hexagonal top surface 704 being larger than hexagonal bottom surface 706. In an assembled display system, the smaller hexagonal bottom surface 706 contacts a wave guide (e.g., wave guide 301). The diameter of the top surface 704 is represented as L2, the diameter of the bottom surface 706 is represented as L3, and the overall height of light-extraction microstructure 700 is H2. The dimensions of L2, L3, and H2 can be varied as desired. In accordance with at least some embodiments L2 is in the range of 3 to 300 microns, L3 is in the range of 2 to 150 microns, and H2 is in the range of 1.5 to 105 microns. Axis 705 is shown bisecting two oppositely facing edges 702 of the top surface 704 and extending through the center of the top surface 704.

Figure 8:
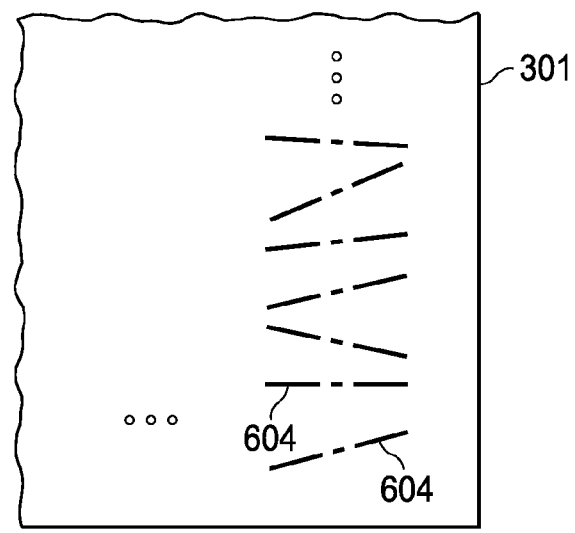
FIGS. 8 and 9 illustrate pseudo-random rotation of light-extraction features for use with a light-extraction graphics film in accordance with an embodiment of the disclosure.
Figure 9:
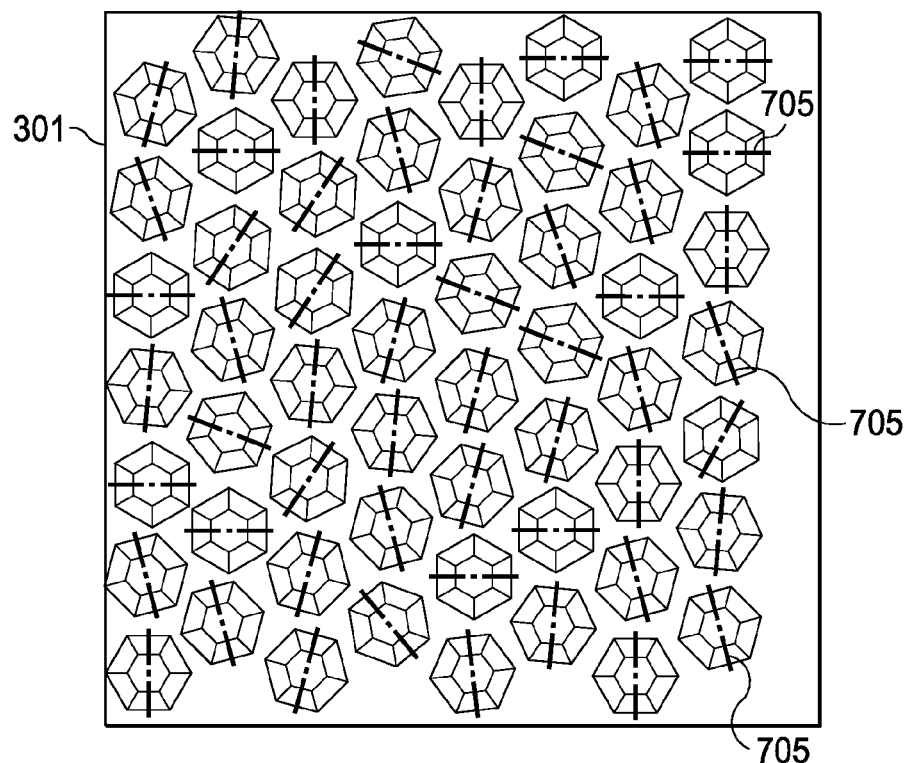

In accordance with various preferred embodiments, the light-extraction features provided on a light-extraction graphics film are oriented in random or pseudo-random fashion as illustrated in FIGS. 8 and 9. FIG. 8 illustrates the axes 604 of a number of the microstructures 206A in contact with wave guide 301. The features 206A themselves are not shown to better illustrate the orientation of the features. In FIG. 9, the orientation of the hexagonally-shaped features 700 is configured as illustrated by the pseudo random orientation of the axes 705. The random nature of the orientation of the light extracting microstructures causes different side faces of various features to receive and reflect the light. Accordingly, light is reflected into different angular directions to improve uniformity of light-extraction.

In accordance with some embodiments, light-extraction features (e.g., features 206A, 700) can be fabricated on an embossing master using a diamond turning or other suitable process. This embossing master can be used by a traditional hot embossing or UV curable embossing process to transfer the microstructure pattern to a thin polymer film, such as Polyurethane (hot embossing) or acrylic film on PET (UV curable). If the extraction feature is made from adhesive, there is no need for diamond turning a master. This can be screen printed onto the light extraction graphics film Assembled display system embodiments such as those disclosed herein are advantageous due to the ability to vary the shape and size of both the transparent wave guide 301 and the light-extraction graphics film (e.g., embodiments 120A-120F). For example, the light-extraction graphics film may be smaller in size than the transparent wave guide 301. In such embodiments, light will only be extracted from the transparent wave guide 301 where the light-extraction graphics film contacts that transparent wave guide 301. Advantages of the disclosed transparent wave guide embodiments include, but are not limited to, an ultra-thin profile, curved surface compatibility, putting graphics film on both sides, locating the sign in places other than flat against a wall, making truly unique and eye catching multi-part graphic advertisements, lower power requirements, and lower cost. Meanwhile, advantages of the disclosed light-extraction graphics film embodiments include, but are not limited to, use of a film with a printable surface on a top-side (compatible with personal and professional printers) and light-extraction features on the bottom-side.

In some embodiments, the light-extraction graphics film is comprised of a first film with a printable surface attached (e.g., with adhesives) to a second film with light-extraction features. The first and second films may be sold/distributed separately with the second film having an adhesive on its top side to attach the first film thereto.

Light-extraction graphics film embodiments do not necessarily cover an entire edge-lit backlight surface. Accordingly, light-extraction graphics film embodiments may be sold/distributed as cut outs, decals, label, alpha-numeric characters, clip art packages, etc., and later combined with an edge-lit backlight. Further, the use of wax pens employed with light-extraction graphics film embodiments facilitates many more options for display systems.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A film for use with an edge-lit backlight, comprising:
   a substrate; and
   a graphics layer and light-extraction features in contact with the substrate, wherein the graphics layer and the light-extraction features are on opposite surfaces of the substrate;
   wherein the substrate comprises light-scattering particles.

2. The film of claim 1 wherein the graphics layer comprises a film with a printable surface.

3. The film of claim 1 wherein the substrate comprises material selected from the group consisting of a transparent acrylic film, a PET film, a Polyurethane film, and a polymer-based film.

4. The film of claim 1 wherein the light-extraction features are positioned to provide uniform light-extraction.

5. The film of claim 1 wherein the light-scattering particles are sized from about 5 nm to 500 µm.

6. The film of claim 1 wherein a density of said light-scattering particles varies throughout the substrate.

7. The film of claim 1 wherein the substrate comprises diffuser properties.

8. The film of claim 1 wherein the light-extraction features comprise shapes selected from at least one of the group consisting of v-grooves, round discs, and ridges.

9. The film of claim 1 wherein the light-extraction features comprise islands of adhesive.

10. The film of claim 9 wherein spacing between said islands of adhesive varies to improve uniformity of light extraction.

11. The film of claim 1 wherein the scattering particles are embedded in adhesive.

12. The film of claim 11 further comprising a transparent cladding layer between the adhesive and the substrate.

13. The film of claim 12 wherein the transparent cladding layer has a refractive index between about 1.03 to 1.45.

14. The film of claim 1 comprising a first sub-film corresponding to the graphics layer and a second sub-film corresponding to the substrate and the light-extraction features.

15. A display system, comprising:
   a light-extraction graphics film having a printed graphics layer and a light-extraction layer; and
   an edge-lit backlight in contact with the light-extraction graphics film, wherein light from the edge-lit backlight is extracted by the light-extraction graphics film;
   wherein the light-extraction graphics film comprises a substrate with light-extraction features in contact with the edge-lit backlight, and wherein the substrate comprises diffuser properties.

16. The display system of claim 15 wherein the substrate comprises at least one material selected from the group consisting of a transparent acrylic film, a PET film, a Polyurethane film, and a polymer-based film.

17. The display system of claim 15 wherein the light-extraction features are configured to provide uniform light-extraction.

18. The display system of claim 15 wherein the light-extraction features are uniformly spaced, wherein the spacing is based on a wave guide thickness corresponding to the edge-lit backlight.

19. The display system of claim 15 wherein the substrate comprises scattering particles to enhance uniformity of light output from the light-extraction layer features.

20. The display system of claim 19 wherein a density of said scattering particles in the substrate varies in accordance with distance from a light-injection edge.

21. The display system of claim 15 wherein the light-extraction features comprise shapes selected from at least one of the group consisting of v-grooves, round discs, and ridges.

22. The display system of claim 15 wherein the light-extraction features comprise islands of adhesive.

23. The display system of claim 22 wherein spacing between said islands of adhesive varies in accordance with distance from a light-injection edge.

24. The display system of claim 19 wherein the scattering particles are embedded in adhesive.

25. The display system of claim 24 further comprising a transparent cladding layer between the adhesive and the substrate.

26. The display system of claim 15 wherein the edge-lit backlight comprises a transparent wave guide with a usable surface area and wherein the light-extraction graphics film covers less than the usable surface area.

27. The display system of claim 15 further comprising multiple light-extraction graphics film cut-outs on a wave guide surface of the edge-lit backlight.

28. The display system of claim 15 further comprising at least one light-extraction graphics film on opposite wave guide surfaces of the edge-lit backlight.

29. A film for use with an edge-lit backlight, comprising:
   a substrate; and
   a graphics layer and light-extraction features in contact with the substrate, wherein the graphics layer and the light-extraction features are on opposite surfaces of the substrate;
   wherein the light-extraction features comprise islands of adhesive.

* * * * *